US010923868B2

(12) United States Patent
Shultz et al.

(10) Patent No.: US 10,923,868 B2
(45) Date of Patent: Feb. 16, 2021

(54) LOW VOLTAGE POWER DISTRIBUTION SYSTEM

(71) Applicant: IDEAL Industries, Inc., Sycamore, IL (US)

(72) Inventors: Edward C. Shultz, Wheaton, IL (US); John B. Melinyshyn, Arlington Heights, IL (US); Saverio Mercurio, Bensenville, IL (US)

(73) Assignee: IDEAL Industries, Inc., Sycamore, IL (US)

( * ) Notice: Subject to any disclaimer, the term of this patent is extended or adjusted under 35 U.S.C. 154(b) by 164 days.

(21) Appl. No.: 16/121,371

(22) Filed: Sep. 4, 2018

(65) Prior Publication Data
US 2018/0375269 A1    Dec. 27, 2018

Related U.S. Application Data

(63) Continuation of application No. 15/960,025, filed on Apr. 23, 2018.
(Continued)

(51) Int. Cl.
*G06F 1/00* (2006.01)
*H01R 25/14* (2006.01)
(Continued)

(52) U.S. Cl.
CPC ........... *H01R 25/147* (2013.01); *H01R 13/02* (2013.01); *H01R 13/6205* (2013.01);
(Continued)

(58) Field of Classification Search
CPC .... H01R 25/147; H01R 24/86; H01R 25/142; H01R 13/02; H01R 13/6205; H01R 24/62; H02J 1/08; H02J 7/0042
See application file for complete search history.

(56) References Cited

U.S. PATENT DOCUMENTS 5,583,419 A   12/1996 Haller
6,184,655 B1   2/2001 Malackowski
(Continued)

OTHER PUBLICATIONS

ISA/US, Int. Search Report and Written Opinion issued on PCT application No. US18/28879, dated Jun. 27, 2018, 10 pages.
(Continued)

*Primary Examiner* — Xuxing Chen
(74) *Attorney, Agent, or Firm* — Greenberg Traurig, LLP

(57) ABSTRACT

The low voltage power distribution bus system for a plurality of connected modules includes an intelligently managed power load. The system maintains a marginal reserve of power while monitoring the amount used of the total power. When a new module is connected, a base power setting for the new module is retrieved. The system calculates available power and compares the base power setting. If the available power is exceeded, the system redistributes a maximum allowed power of each connected module and assigns the new module an allowed maximum power. The allowed maximum power is the base power setting if the available power exceeds the base power setting of the new module and a fraction of the base power setting if the base power setting of the new module exceeds the available power.

20 Claims, 14 Drawing Sheets

Related U.S. Application Data

(60) Provisional application No. 62/553,223, filed on Sep. 1, 2017, provisional application No. 62/488,241, filed on Apr. 21, 2017.

(51) Int. Cl.
| | | |
|---|---|---|
| *H01R 13/62* | (2006.01) | |
| *H01R 13/02* | (2006.01) | |
| *H01R 24/86* | (2011.01) | |
| *H02J 7/00* | (2006.01) | |
| *H02J 1/08* | (2006.01) | |
| *H01R 24/62* | (2011.01) | |

(52) U.S. Cl.
CPC ............ *H01R 24/86* (2013.01); *H01R 25/142* (2013.01); *H02J 1/08* (2013.01); *H02J 7/0042* (2013.01); *H01R 24/62* (2013.01)

(56) References Cited

U.S. PATENT DOCUMENTS

| | | | |
|---|---|---|---|
| 2009/0193276 A1* | 7/2009 | Shetty | G06F 11/30 |
| | | | 713/340 |
| 2012/0151240 A1 | 6/2012 | Robinson et al. | |
| 2012/0166825 A1* | 6/2012 | Blackburn | G06F 1/3203 |
| | | | 713/310 |
| 2015/0378428 A1* | 12/2015 | Selvarajan | G06F 1/3218 |
| | | | 713/323 |
| 2016/0190735 A1 | 6/2016 | Zantout et al. | |
| 2016/0268728 A1 | 9/2016 | Zantout et al. | |
| 2017/0012429 A1 | 1/2017 | Nanda | |

OTHER PUBLICATIONS

ISA/US, Int. Search Report and Written Opinion issued on PCT application No. US18/49402, dated Nov. 8, 2018, 14 pages.

\* cited by examiner

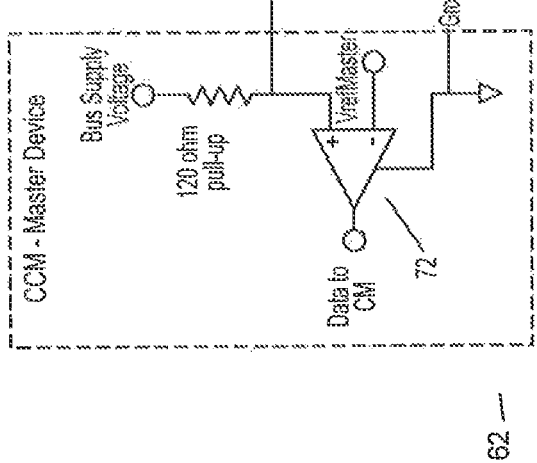

LOW VOLTAGE POWER DISTRIBUTION SYSTEM

CROSS REFERENCE TO RELATED APPLICATIONS

This application is a non-provisional applications claiming priority to Provisional Application No. 62/553,223 entitled "Low Voltage Bus System" filed Sep. 1, 2017, and is continuation of non-provisional application Ser. No. 15/960,025 entitled "Low Voltage Power Distribution System" filed Apr. 23, 2018 which in turn claims priority to Provisional Application No. 62/488,241 entitled "Low Voltage Bus System" filed Apr. 21, 2017, and assigned to the assignee hereof and hereby expressly incorporated by reference in their entirety.

BACKGROUND OF RELATED ART

As mobile devices become ever more ingrained into everyday life, consumers have an ever-increasing need for access to power. Yet, recharging a battery is typically difficult while travelling or anywhere on the go. Most locations built before the digital revolution—like most airports—do not have enough outlets to serve the modern consumer's insatiable demand for electricity. Even where some airports, coffee shops, and the like have introduced charging stations, they can rarely handle the increasing demand and do not usually integrate well into the rest of the building's design and aesthetics.

BRIEF DESCRIPTION OF THE DRAWINGS

FIG. 6 illustrates a receiver circuit for use with an example low voltage power distribution system.

FIG. 7 illustrates an example registration process of control modules on the bus from the perspective of a connection control module for use with an example low voltage power distribution system.

DETAILED DESCRIPTION OF THE DRAWINGS

The disclosed example low voltage power system uses a universal, low profile charging rail. The low voltage power system can be used in, for example, dorm rooms, restaurants, homes, hotels, café s, mass transit stations, libraries, entertainment venues, or any other suitable. The example low voltage power system can be adapted into existing spaces or designed into new projects. The example low voltage power system can be installed in many colors and many locations including in walls, furniture, windows etc.

In general, the following disclosure relates to a connector module provided by a user and the use thereof. In at least one example, the connector module can be attached anywhere along the length of a charging rail with an electrical bus that has a carrier and at least a pair of electrically conductive elements. In this instance, the pair of electrically conductive elements in the rail extend linearly along a length of the carrier and at least a portion of each of the least a pair of electrically conductive elements is exposed at a surface of the carrier. Magnets within the connector module secure the connection to the rail. The connector module has at least a pair of electrically conductive contacts for engaging with the electrically conductive elements at any desired location along the length of the carrier. Low friction between the connector module and the rails and the continuous design of the rail allow the attached module to slide without disconnecting the device from the flow of power. The module's electrical connections are fully rotatable so that the user can face the module in any direction that they need.

The example electrical bus in the rail further includes a data carrying element for communicating with the connector module and, as needed, with the device coupled to the connector. The rail system communicates with the modules to determine the optimal load to each device. If too many devices are connected to the rail, an intelligent load arbitration system reduces the power delivered to devices that are not utilizing the full amount of power available. Additional circuitry protects the rail from misuse and distributes power among the connected devices if there is a shortage.

Figure 1:
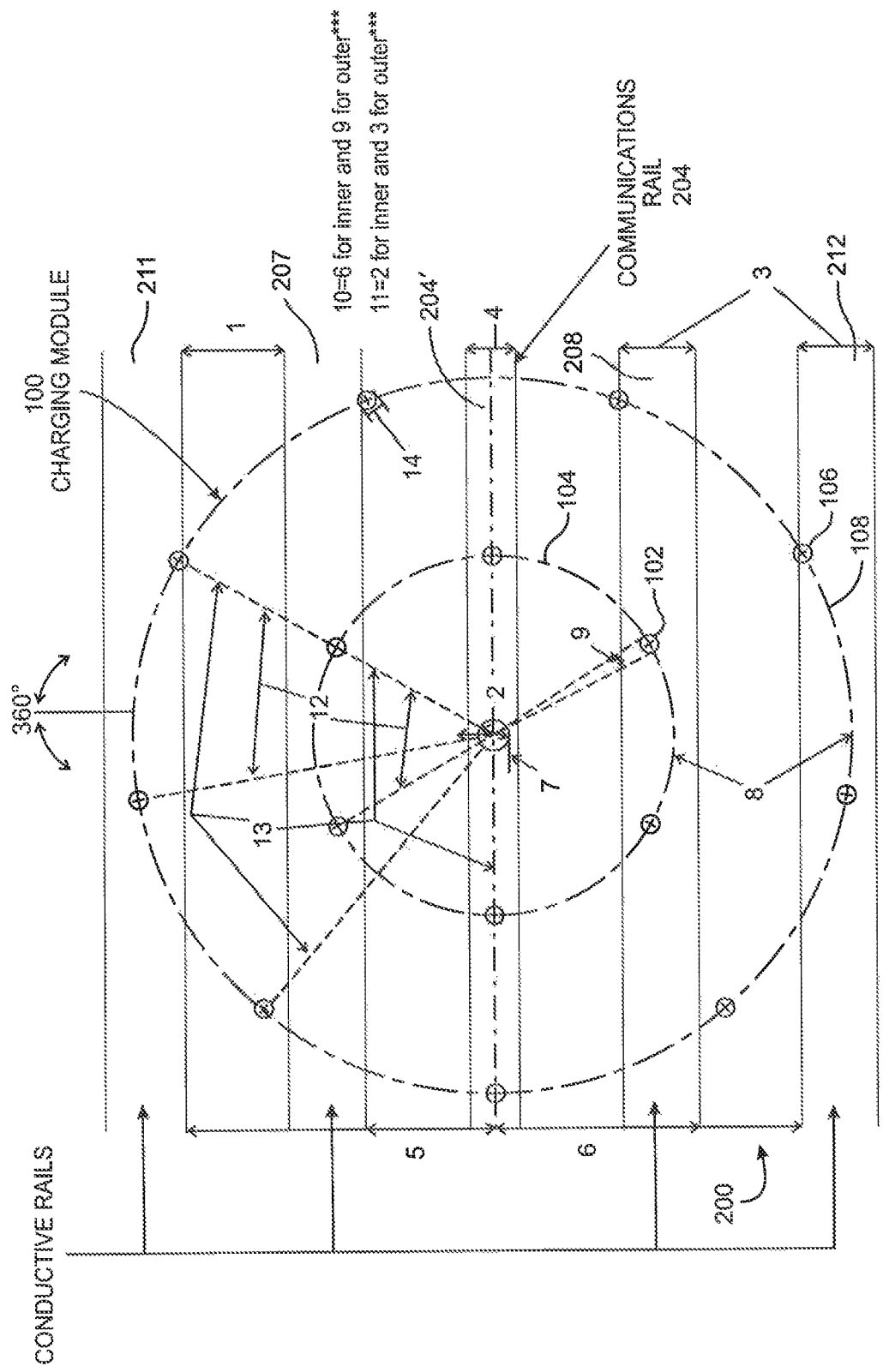
FIG. 1 is a schematic diagram illustrating an example contact configuration for a charging module created via use of the methodology described hereinafter.
Figures 4, 5:
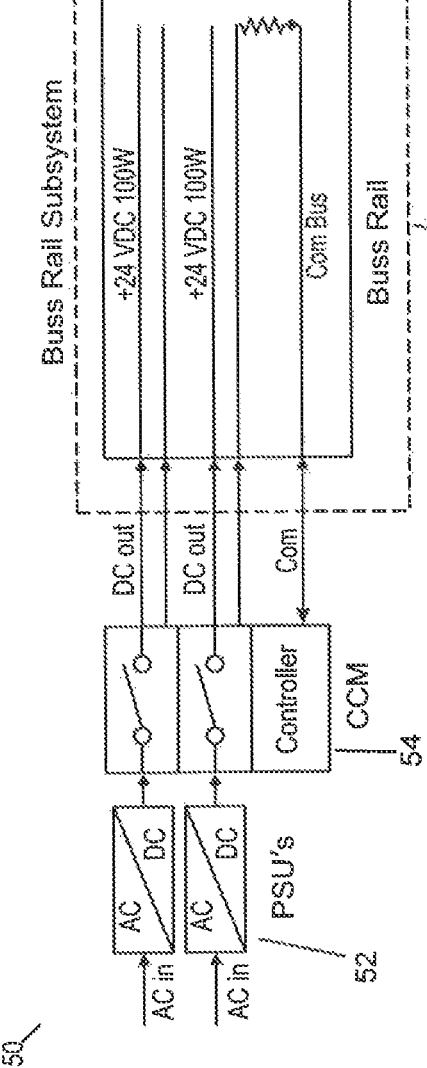
FIG. 4 is a system overview of an example low voltage power distribution system.
FIG. 5 illustrates a driver circuit for use with an example low voltage power distribution system.

With reference to the figures, an example conductive bus system using the low voltage power distribution system is now described. In general, the conductive bus system includes a charging module 100 that is intended to be electrically coupled to a conductive bus 200. The charging module 100 includes a plurality of electrical contacts 102 that are arranged such that a first circle 104 can be visualized to generally connect the plurality of electrical contacts 102 as shown in FIGS. 1 and 4. The charging module 100 may further include, or alternatively include, a plurality of electrical contacts 106 such that a second circle 108 can be visualized to generally connect the plurality of electrical contacts 106 as also shown in FIG. 1. In one example, the plurality of electrical contacts 102 are intended to be used to provide a first direct voltage/current to the charging module 100 from the conductive bus 200 while the plurality of electrical contacts 106 are intended to be used to provide a second direct voltage/current to the charging module 100 from the conductive bus 200. The charging module 100 will further include electrical componentry for delivering a direct voltage/current received from the conductive bus 200 to a device that is coupled to the charging module 100. To this end, the charging module 100 may include, by way of example only, a universal serial bus (USB) port 110 for receiving a USB connector which, in turn, would be coupled to a device that is to be charged, such as a phone, computer, tablet, etc. The charging module 100 may yet further include an indicator 112, such as a light emitting diode (LED), to provide to a user an indication that the charging module 100 is receiving direct voltage/current from the conductive bus 200.

Figure 3A:
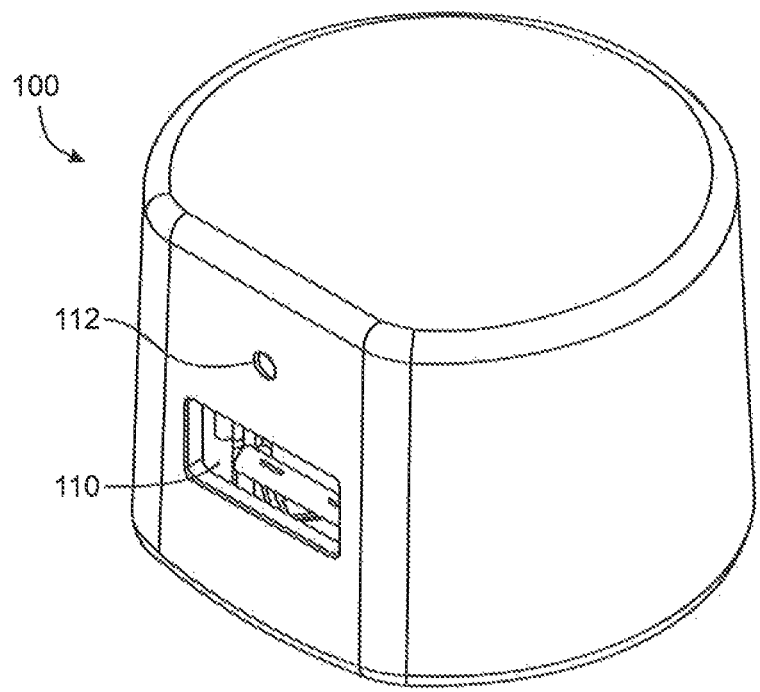
FIGS. 3A and 3B illustrate an example charging module.
Figure 3B:
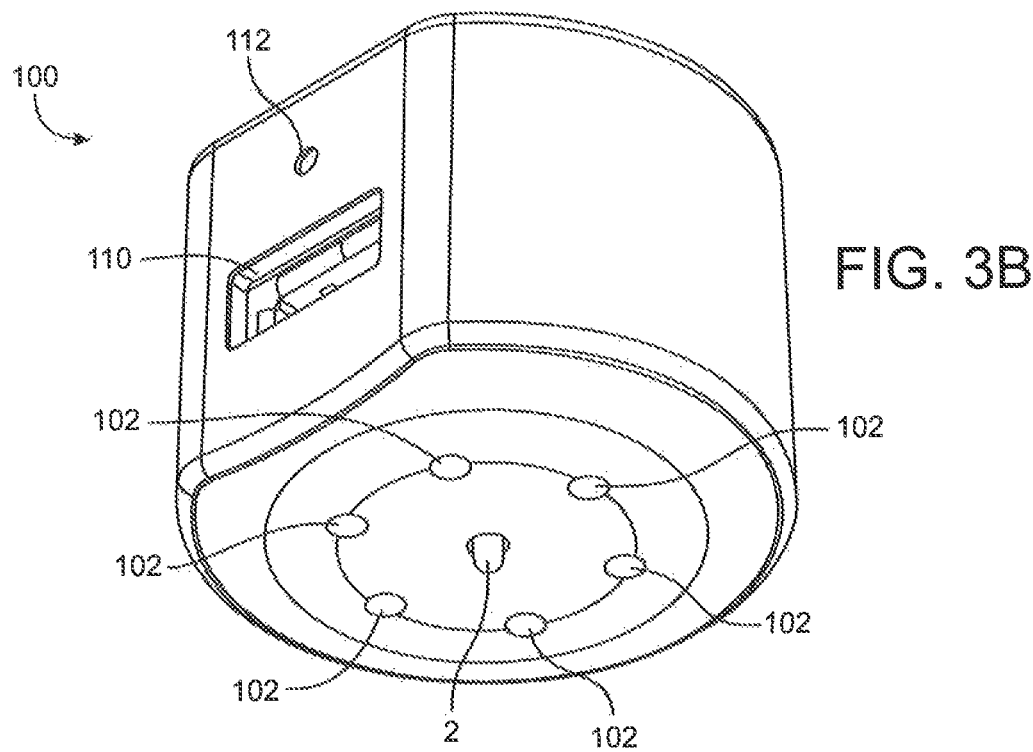

As further illustrated in FIGS. 1 and 3B, centered within the plurality of electrical contacts 102, i.e., centered within the visualized first circle 104, and/or centered within the plurality of electrical contacts 106, i.e., centered within the visualized second circle 108, is a further electrical contact 2. In an example, the electrical contact 2 is in the form of a magnet. The electrical contact 2 is intended to, but need not be used to, receive a communication signal via the conductive bus 200. The communication signal received via the conductive bus 200 may be used to control functional operations of the charging module 100, e.g., to turn the charging module on/off, to throttle the amount of current that the charging module will draw from the conductive bus 200, etc. The communication signal received via the conductive bus 200 may additionally, or alternatively, be passed through the charging module 100 to the device that is coupled to the charging module 100 via the port 110 to thereby allow functional operations of the device being charged to be likewise controlled as desired.

Figure 2:
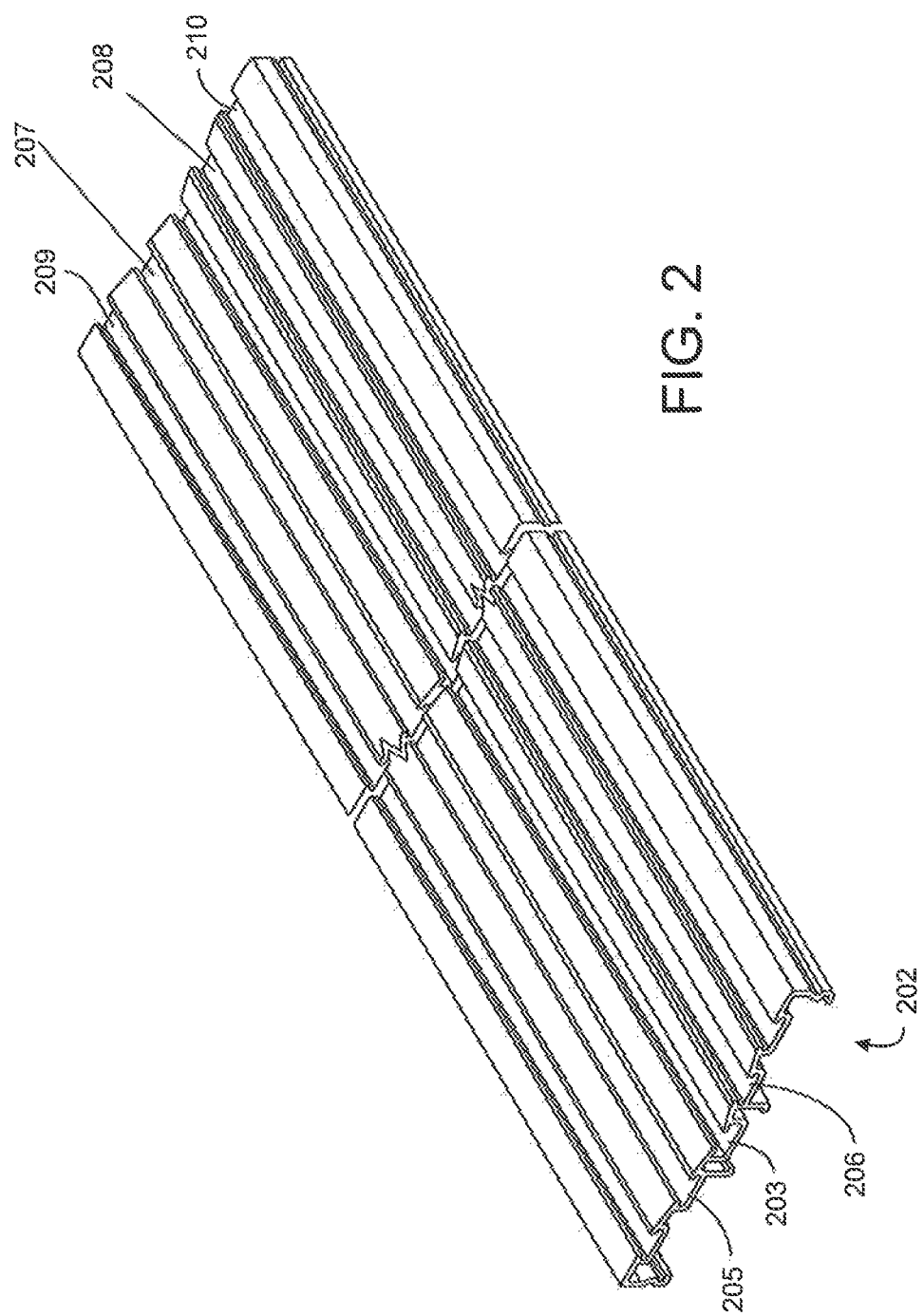
FIG. 2 illustrates an example carrier of the conductive bus for use in connection with a charging module.

An example of the conductive bus 200 to which the charging module 100 is to be coupled includes an elongated carrier 202 constructed from a non-conductive material. In an example, the carrier 202 includes a channel 203 in which is disposed a ferromagnetic rail 204 as shown in FIG. 2. When disposed within the channel 203, a surface 4 of the ferromagnetic rail 204 will preferably be exposed from the conductive bus 200 whereby the electrical contact 2 will be able to directly engage with the ferromagnetic rail 204 when the charging module 100 is disposed upon the conductive bus 200. While not required, the ferromagnetic rail 204 may be used to carry a communication signal, received from a controller that is coupled to the conductive bus 200, for provision to the charging module via the electrical contact 2 as described above. The carrier 202 further includes channels 205 and 206 for carrying conductive rails 207 and 208, respectively. When disposed within the channels 205 and 206, a surface 3 of the conductive rails 207 and 208 will preferably be exposed from the conductive bus 200 whereby at least one of the plurality of electrical contacts 102 will be able to directly engage with the conductive rail 207 and at least one of the electrical contacts 102 will be able to directly engage with the conductive rail 208. The carrier 202 may further include, additionally or alternatively, channels 209 and 210 for carrying conductive rails 211 and 212, respectively. When disposed within the channels 209 and 210, a surface 3 of the conductive rails 211 and 212 will preferably be exposed from the conductive bus 200 whereby at least one of the plurality of electrical contacts 106 will be able to directly engage with the conductive rail 211 and at least one of the electrical contacts 106 will be able to directly engage with the conductive rail 212. It will be understood that different configuration for the carrier 202 may be utilized as required and, as such, the carrier 202 illustrated in FIG. 2 is being provided by way of example only.

The charging rail has two charged portions that run along the length of the track. The rail is connected to the building's power via a universal input power supply that steps the voltage down to 24V of direct current. The voltage potential between these charged portions is thereby kept low so that it is safe to touch and meets NEC Class 2/CE requirements. Power is delivered along the length of the rail, which is customizable. In one example, it is twenty-five feet long. In this example, 100 W is delivered to the twenty-four devices attached to the rail.

To ensure that the charging module 100 shown in FIGS. 3A and 3B will engage with the conductive bus 200 to thereby allow the charging module 100 to be electrically coupled to the conductive rails regardless of the use orientation of the charging module 100 when positioned upon the conductive bus 200, i.e., in any orientation of the charging module 100 throughout the full 360 degrees of the visualized circles 104 and/or 108 when the contact 2 is engaged with the rail 204 as shown in FIG. 1, the algorithms set forth hereinafter are to be used to determine the number of contacts 102 and/or 104 that are to be included in each set of the plurality of contacts, the positioning of the contacts 102 and/or 104 (as well as the contact 2), etc. given the design considerations of the conductive bus 200 and/or contacts available for use in constructing the charging module. As concerns the contact 2, the contact 2 be sized and arranged on the base of the charging module 100 in some examples such that, when the contact 2 is positioned in the vicinity of the rail 204, i.e., will be magnetically attracted thereto, the charging module 100 will generally center itself, i.e., generally center the virtual circles 102 and/or 106 upon a center line 204' of the rail 204, whereby, in any and all orientations of the charging module 100 relative to the conductive bus 204 at least one of the plurality of electrical contacts 102 will directly engage with the conductive rail 207 and at least one of the electrical contacts 102 will directly engage with the conductive rail 208 and, if used or in the alternative, at least one of the plurality of electrical contacts 106 will directly engage with the conductive rail 211 and at least one of the electrical contacts 106 will directly engage with the conductive rail 212.

Other example bus systems—in which the communication protocols and software described hereinafter may be utilized—are disclosed in U.S. application Ser. No. 14/986, 225, filed on Dec. 31, 2015, U.S. application Ser. No. 14/857,918 filed on Sep. 18, 2015, U.S. application Ser. No. 14/030,768, filed on Sep. 18, 2013, U.S. Provisional Application No. 61/725,795, filed on Nov. 13, 2012. U.S. Provisional Application No. 61/768,907, filed on Feb. 25, 2103, U.S. Provisional Application No. 61/744,777, filed on Oct. 3, 2012, and U.S. Provisional Application No. 61/744,779, filed on Oct. 3, 2012, the disclosures of which are incorporated herein by reference in their entirety.

Referring now to FIG. 4, an example of the Low Voltage Power Distribution ("LVPD") System 50 is shown. In the shown example, a circuit diagram depicts the connections between the various components of the LVPD system 50. The LVPD system 50 includes a number of electrical connected modules and subsystems. In the example shown, the LVPD system includes AC/DC Power Supply Unit (PSU) 52, Configuration Control Module (CCM) 54, and Bus Rail Subsystem 54. AC/DC PSU 52 may for example convert a building power supplied to the unit in AC power to DC power for the LVPD system 50 to provide to the devices. The CCM 52 includes a controller 53 to store and process commands to manage the system 50 as well as control signals with the mounted devices. Bus rail subsystem 54 can be, for example, a rail as shown in FIG. 2 above. These components in concert provide a connection to a charging Module (CM) as discussed above with respect to FIGS. 1, 3A, and 3B including a 1SW Type-A USS CM, a 15 W Type-C USS C.M.; 30 W Type-C with USB-PD CM; and a W DC Barrel Output CM.

In this shown example of FIG. 4, the physical design comprises of a single wire that connects each of the multiple connector modules together in order to support digital communications as well as the distributed power capacity. To do so, the center conductor of the bus rail provides the signal wire along which communications between the controller and the connected modules. A ground connection of the "inner" set of power supply rails provides the ground return for the power supply circuit. Therefore, all modules must connect to the ground of the inner set of power supply rails as discussed above.

Referring now to FIG. 5, a circuit diagram of an example driver circuit 60 is shown. The connection/control Module (CCM) 62 acts as the primary circuit device of the data bus 66 while the Charger Modules (CMs) 64 act as secondary circuit devices. This allows the CCM 64 to control the communication and power distribution to each and every device connected to the rail. The CCM 62 controls when devices are allowed to communicate to avoid collisions. The rail connections in the data bus 66 between the shown components in the example circuit are arranged in an "open drain" or "open collector" design by connecting the signals to a grounded component such as ground return 68.

The example data bus 64 has characteristic impedance of −120 ohms. A 120 ohm of resistance is placed within the CCM 62 and within the bus "terminator" at the other end of the bus. Together, these equalize the resistance of the circuit elements and are confirmed in IEM simulations of the bus. In the example used, bus voltage is set to a nominal −2.8V. The bus voltage is typically chosen as a compromise between high voltage for noise immunity and low voltage for minimum electromagnetic interference. The CCM 62 typically holds the data bus line in the "high" state (−2.8V) while the device (CCM 62 or CM 64) that is communicating on the bus. The CCM 62 is configured to pull the line low when necessary, such as for communications to prevent signal noise from impairing the flow of communications between the CCM 62 and the connector.

The CM 62 includes a diode bridge 65. The Diode bridge 65 is necessary to support rotation of the CM 62 and causes the CM 64 ground to between −0.2V and −0.4V (Vd) above the CCM 62 ground. Signal levels may vary through the system due to the fact that the CM modules contain a diode bridge in the ground path as well as the ground path resistance of the bus rails. Ground path resistance causes up to an additional −0.3V drop (lgnd*Rgnd). Therefore, altogether data low and high voltages vary up to −0.7V between the CCM 62 and the worst case CM 64.

Referring to FIG. 6, a circuit diagram of the receiver circuit 70 is shown. A primary comparator 72 in the CCM 62 and a module receiver 74 in the CM 64 are utilized as the receiver circuit with a receiver threshold. The receiver threshold is a predetermined level at which the comparator is activated. The receiver threshold is centered between the worst case high and worst case low for each device. The receiver thresholds are different between the CCM 62 and the CM 64 due to the ground shift of the output of the CM 64 of comparator is at the logic level of the processor in the CCM 62.

Within the example data bus 66, the bus speed has been set to approximately 230,400 bits per second. At this speed, the example e-data bus can handle a maximum number of devices and their respective modules 64 connected to the rail based on worst case simulation of maximum bus traffic. In this shown example, the speed is supported by the example processors Microchip 8-bit PIC16LF18345 for the CM NXP LP1769, 32-bit ARM Cortex M3 for the CCM for the simulations. Other suitable processors for data bus communication and processing are also considered.

Before discussing the features of the CCM 62 and CM 64 individually, the communication and registration processes are discussed. As many of the later discussed features of the modules involve this communication data bus 66, an understanding of the bus lays the foundation of those module abilities.

Data byte framing within the example data bus 66 follows a standard universal asynchronous receiver-transmitter ("UART") protocol. The communication protocol is implemented by the CCM 62 and CM 64 described further below. The protocol includes one start bit and one stop bit for every packet of information and requires ten bits to send each eight bit data byte with the least significant bit sent first. When transmitting, the bytes are sent with most significant byte first. The data bus 66 utilizes the UART protocol implemented via processor hardware.

Turning more specifically to the UART communication bus protocol, the CCM 62, through its processor (not shown), controls when each device can access the communication bus 66. The control by the processor is used to prevent bus collisions. Along the bus, at least three types of messages are sent: 1) direct messages, 2) broadcast messages, and 3) request messages.

In a direct message, the CCM 62 addresses a specific CM 64 with a message to which the CM 64 must immediately respond within a specified time limit (e.g. 1.5 ms in the example data bus). Only the addressed CM 64 may respond to the direct message to prevent collision. All other CMs 64 ignore messages to which they are not addressed. In this situation, the CCM 62 may, for example, be instructing the CM 64 how much current to draw or asking for a device type identification.

In the broadcast message situation, the CCM 62 sends a "Broadcast" message to all devices on the bus for which there is no response expected from any CM 64. This message could be communicating timing or rail related information.

In a request message scenario, the CCM 62 sends an access broadcast message with numerous "time slots" within which a CM 64 may respond. This is used only for the initial bus access by a newly added CM 64. Each CM 64 randomly selects one of the time slots in which to respond. The CM 64 is programmed to select a new time slot if CCM 62 does not receive the message from the CM 64. The lack of response could occur due to a collision with another CM 64 that happened in the event that two or more CMs 64 randomly select the same time slot.

Each message structure contains four elements: 1) 8 bit Bus Address, 2) 16 bit Message Header, 3) an optional Data Bytes Number, and 4) Cyclic Redundancy Check.

The 8 bit Bus Address directs the message to the correct device. The CCM 62 bus address is typically the first possible digit, in the 256 bit example this would be 0. Broadcast messages also get an assigned address, in the 256 bit example the broadcast message will use bus address 255. Each CM 64 is assigned a bus address by the processor of the CCM 62. In one example, the CMs 64 will each be assigned an address. All CMs "listen"—for the bus address they have been assigned. In the 256 bit example, each CM is assigned a bus address from 1 to 254. The CM's 64 assigned number may change each time the CM 64 is added to the bus. The CM 64 ignores any messages addressed to anything other than its assigned address.

The Message Header provides the basic information about the following message needed for processing, including the size of the message, the message identifier, and the message type. The message size is expressed in a number of bytes. In a 16 bit header example, the number of data bytes is a 6-bit identifier of the up to 63 byte message. The identifier of the message is a number used to distinguish distinct messages, for example those sent to the same recipient device. In the 16 bit header example, a 3-bit MessageID Value cycles from 0 to 7 as a unique ID for each message.

Finally, the message type is identified. In the 16 bit header example, this is a 6-bit identifier. The message type identifier may, for example, be a specific type of message like an initialization, a disconnection, or an error report. Some specific types of messages are: Authentication messages verify that a device is not a duplicate of an existing device. Specification queries are messages to obtain slave device capabilities including determining the type of device and whether the device supports modules other than charging modules. Power management messages control the amount of power drawn by the CM 64, for example setting the power setting for 7.5 W, 15 W, or no power at all. Roll call messages obtain current measurements at each connected CM 64. These roll call messages can be used to detect "alien devices" drawing current without being linked into the system. Quality assurance messages can be used for testing purposes, for example to measure bit error rate.

Following the message header, a number of data bytes may be sent. For some messages, like error reports, the system may not need to send more information than the message type. However, other messages may require information is sent along. An optional number of data bytes, which were indicated in the header, include the data sent along the bus. In the example data bus, the messages range from 4 to 37 bytes in length.

Each message ends with an error checking feature such as a cyclic redundancy check (CRC). Error checks are a mathematical derivation of the bits of the message contents to verify the correct transmission of the bits. In the example message, the error check is an 8-bit or 10-bit depending on the number of bytes in the message. In the shown example data bus, the error checking is designed for a minimum Hamming distance of 4.

Figure 8:
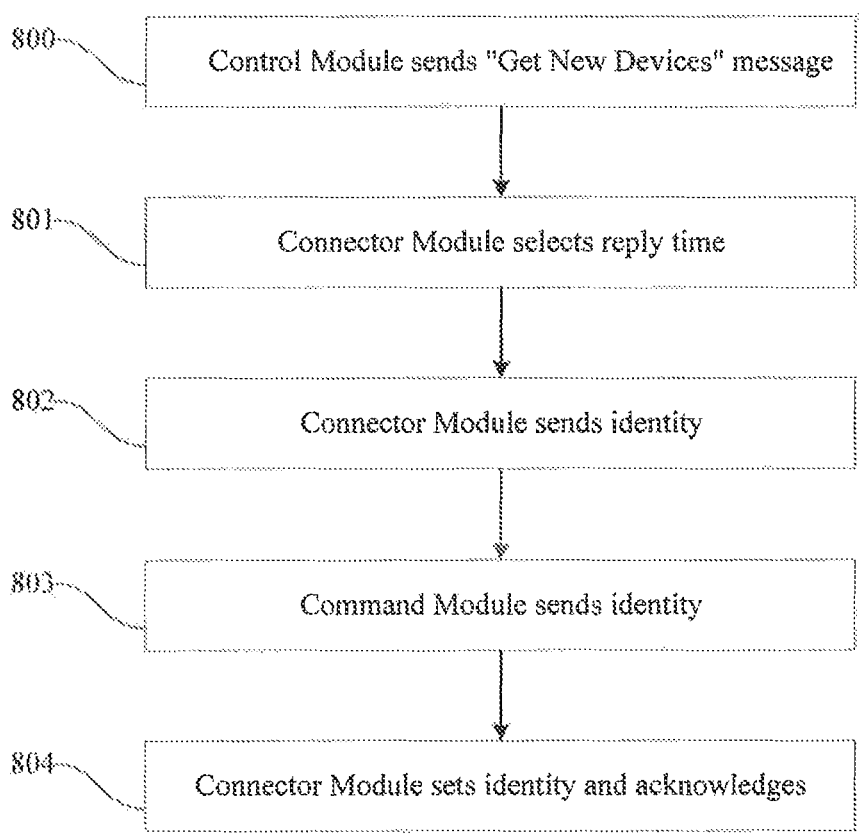
FIG. 8 illustrates a registration process for an example connector module for use with an exemplary low voltage power distribution system.
Figure 9:
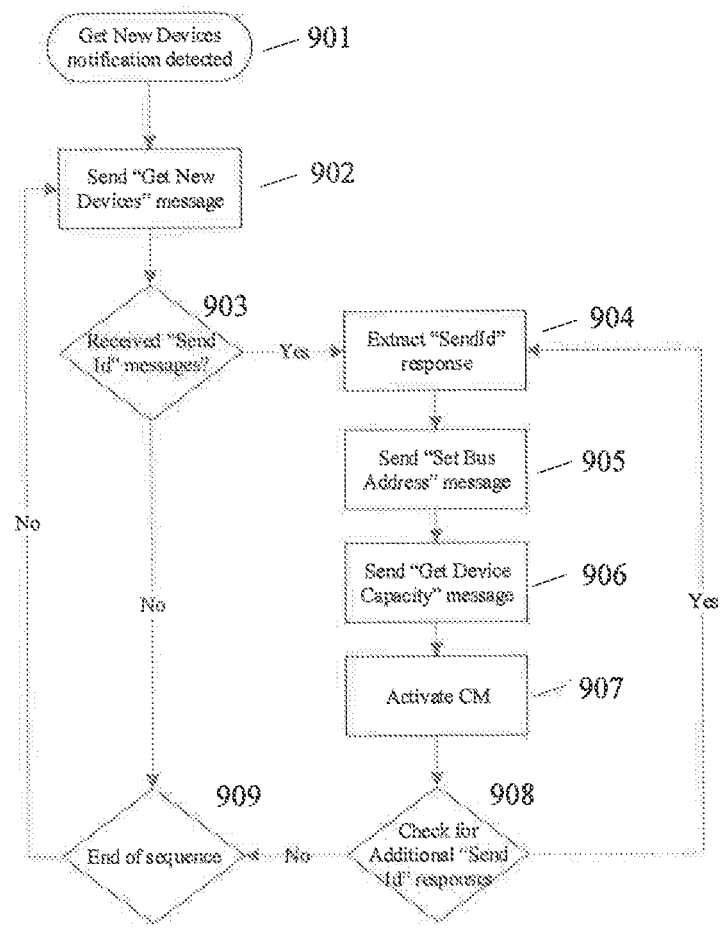
FIG. 9 illustrates another registration process for an example connector module for use with an exemplary low voltage power distribution system.

Referring to FIG. 7, which shows a depiction of the example registration process 70 between an example controlling device, like the CCM 62 shown above, and an example connected module like the CM 64. FIGS. 8-9 shows a specific example process of this process. The process is triggered by a notification at block 901. In order to connect new devices, the CCM 62 periodically transmits the "GetNewDevices" message sequence at blocks 800 and 902. Each message in the new device registration sequence has a number of defined time slots that follow the message, e.g. sixteen in the example shown. The message sequence consists of a number of messages, e.g. eight in the example shown. Messages are distributed to avoid collisions, for example the messages may be equally spaced over a one second period. Only CMs 64 that do not have an assigned Bus Address respond to the "GetNewDevices" message sequence. The CCM 62 in the example system normally sends one sequence per second. In some examples of the low voltage power system, the registration process further includes an authentication procedure such as an encryption predefined handshake between the CCM and CM.

At block 801, the CM 64 randomly selects one time slot in which to respond, for example 1 of the 128 available slots. When the time slot occurs, CM 64 sends its 72-bit device address to the CCM 62 within the time slot with the "Send/D" message and is received by the CCM 62 at block 803 and extracted at block 804. At blocks 802 and 905, the CCM 62 responds to the "Send/D" message with a "SetBusAddress" message with its identity information, for example with the 72-bit device address and an assigned 8-bit Bus Address (e.g. 1 to 254). At block 803, the CM 64 replies with an Acknowledge message. All future communications with the CM use the 8-bit Bus Address. Once the CM 64 has been registered with the CCM 62 using the process shown in FIG. 8, the CCM 62 can communicate with the CM 64 by addressing it with its unique identifier, e.g. the 8-bit Bus Address. At block 906, the CM is sent an initial current setting (see more detail below with respect to Fig. D) and then activated at block 907. If there are additional devices the CCM 62 repeats the registration process at block 908 or ended at block 909.

In order to interact with the CCM 62 and monitor the power use of the connected device, software is loaded onto a local processor on the CM 64 itself. The CM software supports a bootloader to load new code through the data bus. As discussed above, initially, the CM software only responds to the "GetNewDevices" message sequence by randomly selecting a time slot to send the "Send/D" message. In the example system, the bus software supports communication at near full capacity (230,400 bits per second) and not miss any message. The CM software also performs alarming functions to alert the system in the event of physical or technical errors, including confirming that the messages are periodically received from the CCM 62.

After this registration is complete, the CM software monitors the data bus and identifies messages to which it is addressed. As discussed above, the CM 64 is assigned an address by the CCM 62. The CM software receives all messages, performs the CRC check/correction, and then determines if the address matches its Bus Address or if it is an applicable broadcast message. In the event that the message is not for the CM 64, the data is discarded. If the message is correctly addressed, the CM software processes the message and responds accordingly within the allocated time window which is approximately 1.5 ms in the example system. Message responses may include responding to messages to which it is addressed with an acknowledgement or providing information. Other message responses may include performing the requested action based on the message type received from the CCM 62.

Turning now to specialized structures and functions of the CCM 62, the module architecture is arranged such that it is a repeating central loop. The central loop employs notifications added to the notification queue by interrupt handlers or by code within the main loop itself. In some embodiments of the invention, notifications in the queue do not have priorities assigned to them and notifications are handled in the order in which they are added to the queue. In other examples, the notifications can be prioritized by type, sender, or any other suitable qualification. The CCM architecture also performs other tasks, regularly throughout the loop to perform monitoring and maintenance tasks. In some examples of the CCM 62, interrupt support tasks that must be performed at specific times relative to a real-time clock such as sending out the messages GetNewDevices, control the operation of communication buses 66, checking for alarm conditions or foreign devices on the rail, updating long-term timeouts, updating time-related statistics such as the time that the bus is occupied by Charging Modules and other tasks that need to be handled promptly. In some examples of the present module, the interrupts are prioritized so that the communications along the bus are monitored first.

Referring now to Fig. B, the top-level flow chart 1000 for the main loop of the CCM 62 module architecture. At block 1001, the loop begins after any reset with a boot-loading protocol. The system initializes at block 1002 and completes its set-up operations at block 1003. The main loop 1004 then runs, unless interrupted. Each of these will be discussed in turn.

Figure 10:
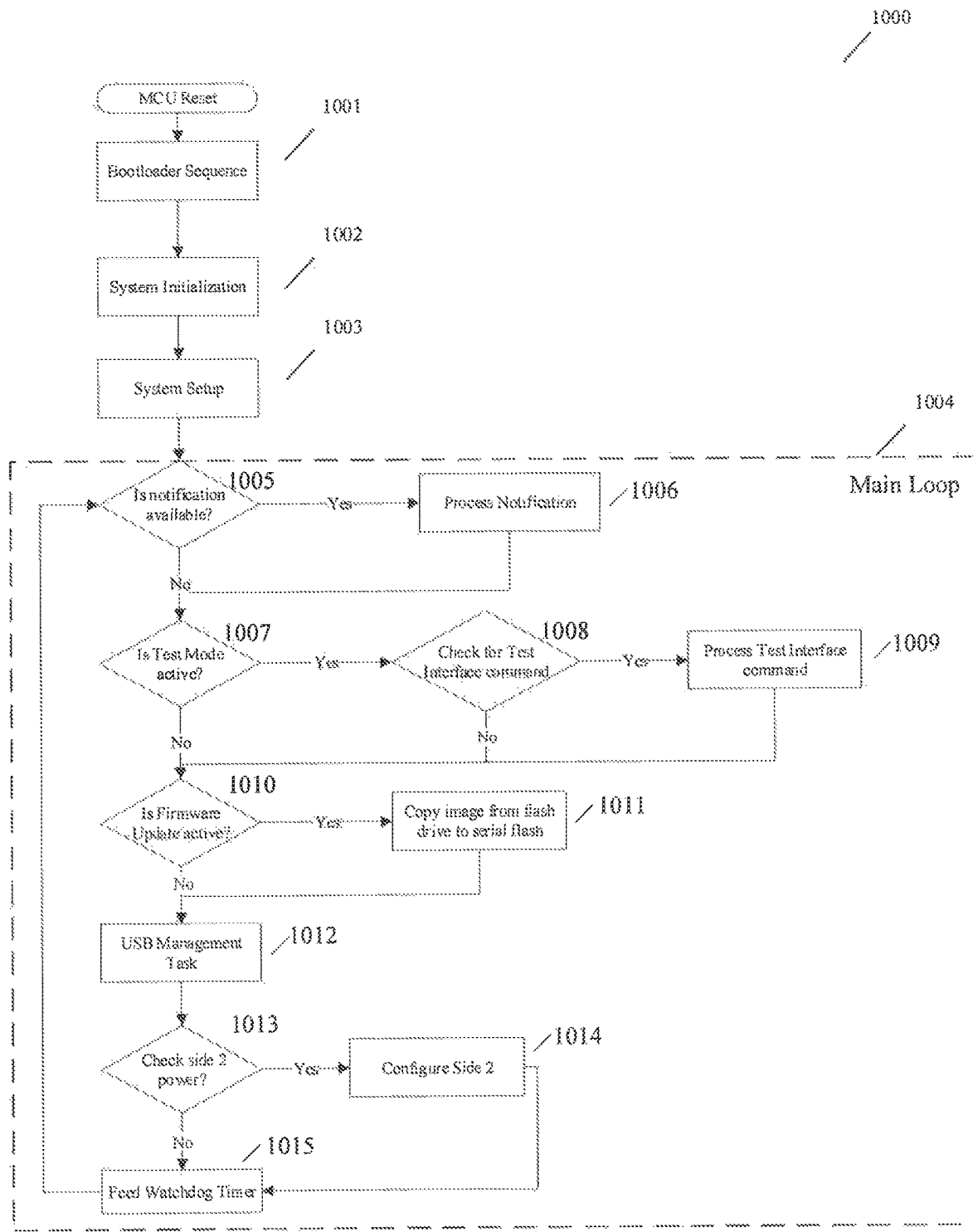
FIG. 10 is a flowchart of the central functionality of an example connection control module for use with an exemplary low voltage power distribution system.

The bootloader sequence is the first thing that is executed when the module starts up as shown in the block 1001 in FIG. 10. In the shown example, two bootloaders exist: the built-in, or first-stage bootloader, and the secondary, or second-stage bootloader. The first-stage bootloader is contained within the ARM core. It is programmed into the part by the manufacturer of the MCU. The first-stage bootloader allows programming of blank parts (either new parts, or parts that have had the program flash erased). It uses the UART0 lines for communication using commands defined in the datasheet of the MCU. In some examples, it is triggered by setting a pin (that is normally high) to a low state prior to applying power. The second-stage bootloader provides custom handling of the upgrade process for the firmware. Its basic function is to determine if a new image has been placed in the external serial flash. If no new image has been placed in the serial flash it simply jumps to the application code. If a new image is present, it copies that image to the MCU's flash, overwriting the existing application code.

At block 1002, the system is initialized. As part of the initialization process, various local and global variables are set to default values, in the example shown, this is based on the datatype (e.g., Booleans to "false", numerics to zero). It should be noted that some of these variables will be later set to values read from the serial flash. The firmware configures the system clock. In the example shown, the system clock is configured for 120 MHz. The system also initializes the general input output hardware module, the pin connection block, and Analog to Digital Converter hardware module. The module checks the input voltages and in some examples of the present invention can shut down the module electronics to protect them from non-standard or unexpected voltages. Then, the UART message protocol is initialized as well as the I2C, serial peripheral interface (SPI), universal serial bus (USB), real-time clock (RTC), stopwatch, current measurement timer, power restart timer, and a watchdog protocol.

At block 1003, the system assigns hardware ports to the module's control system. In some examples, these include serial ports, UART ports, power monitoring ports among other IO and control options. Memory is retrieved and parameters are established for normal ranges of operation. Statistics are saved to the memory at regular intervals, including at block 1003.

At group 1004, the main loop initiates. The main loop uses a notification system to instruct the main loop to perform tasks. At the beginning of the main loop the notification queue is checked to see if there are any pending notifications. If a notification is available, the task associated with that notification is performed.

While FIG. 10 shows a number of notifications considered at block 1005 and executed at block 1006, and where they are arranged in the main loop, a number of possible notifications exist. One notification is a flag to send a "get new devices" message to check for any new CMs 64 on the device. Another notification used in the example system is to start a new current measure sequence or ask the CMs 64 to measure current. Other notifications can save statistics, start error checks, confirm messages are received, whether devices are connected to the ports, and ping devices on the system for debugging purposes.

At block 1007, the main loop checks to use if an administrator is testing the device, for example, over the USB connection. If so, at block 1008, the interface tests for a specific command and implements it at block 1009. Examples of commands include address checking, data verifications, and notification or alarm monitoring.

At block 1010, if a drive is connected via USB, the system regularly checks to see if a firmware update can be installed. If so, installation is handled as discussed previously at block 1011. At block 1012, the other functions of the USB drive are handled such as human interface devices, like a keyboard, test rig, or connection to a PC.

At block 1013, the system determines if the power supply for side 2 has actually been plugged into the CCM. If it is, the controls for communicating on the second side are configured as well at block 1014.

At block 1015, the system resets the watchdog timer. This time constantly resets by the main loop. In the event the loop is incidentally locked up somewhere, the timer will not get reset and an interrupt can reset the system.

Figure 11:
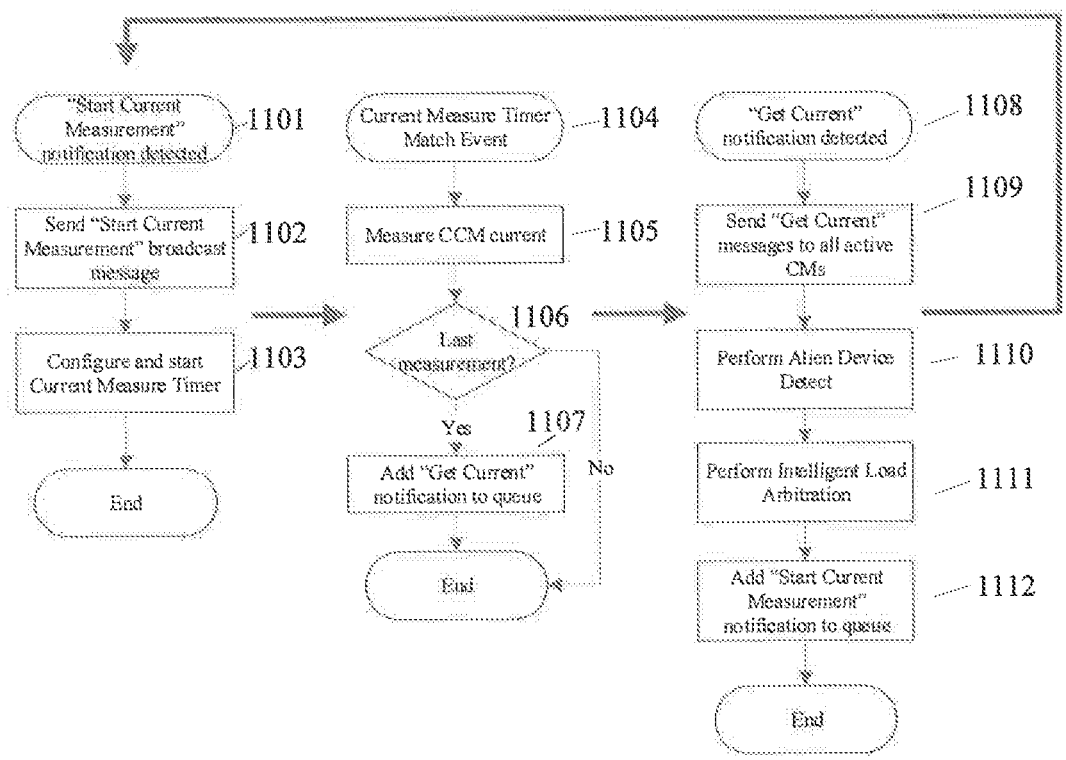
FIG. 11 illustrates an example cooperative process of the various modules measuring and communicating current across the entire bus system for use with an exemplary low voltage power distribution system.

Current measurement is performed periodically by the CCM 62. From the CCM's 62 perspective this is shown in FIG. 11, when the current measure is triggered by a notification at block 1101. The timing of current measurement is set by a "StartCurrentMeasure" broadcast message periodically sent by the CCM 62 at block 1102. At block 1103, a timer is started to let the CMs 64 each have time to measure current at their respective locations on the bus. This delay allows the CMs 64 to process the messages and buffers are used to space the messages. The CCM 62 also measures its own current at blocks 1104 and 1105. After this at block 1106, it queues a notification to poll the CMs 64 for their own currents at block 1107. The CM software also monitors and verifies system attributes such as module temperature, CM output voltage, input voltage, and current by similar means as would be understood by one of ordinary skill in the art.

When that broadcast message is received, the CM 64 measures input current. The measurement data is reported to the CCM 62 when requested by the "GetCurrent" message sent specifically to each CM 64. In response to "SetMaxPower" messages, the CM software can enable the five volt DC output as instructed by the CCM Output setting, which in the shown example is 15 W, 7.5 W, or 0 W. The CM software also participates in bit error rate (BER) measurements as instructed by the CCM 62.

At block 1108, the CCM 62 processes the "Get Current" notification which signals the CCM to beginning the collection process of each module's measured currents. Each CM 64 is sent a message to report its current in turn at block 1109. At block 1110, alien device detection is accomplished as discussed below. At block 1111, the intelligent load algorithm discussed below is run. After this at block 1112, the cycle begins again with a new start current measurements notification.

Turning back to the CCM 62, a host or data port provides a means to load new code into the system and in particular the CCM software. In the example CCM 62 shown above the data port is a USB port on the side of the device. New code is loaded into the system as in this example, using a file contained on a flash drive which is automatically installed by the CCM 62 software when the drive is connected. The CCM 62 validates new code load and transfers new code into its memory. This requires that the CCM software support the storage of two versions of code: the current version and the new version of code. The new code is not initialized and run on the system until the CCM 62 is reset, to prevent the system going offline while in use. Upon a power cycling or a reset of the system, the CCM 62 runs the new code. The previous code is stored in the CCM 62 in case the user needs to restore the device using a mechanism to revert back to a previous version.

The CCM software receives all messages sent by the CMs 64. The CCM software receives and processes all messages, performs the CRC check/correction, and then determines if the address matches its Bus Address (0 in the example). In some examples, the CCM 62 does not handle all communications and some CMs 64 communicate with each other. Like the CM software, the CCM software supports a bus at full capacity (230,400 bits per second in the example) and not miss any messages. The CCM software also performs the alarming function in coordination with the CMs 64.

The CCM software provides an isolation detection procedure to prevent users from tapping power from conductors without communicating with the bus and an alien device detection procedure to prevent counterfeit connectors from being used to recharge a device coupled thereto. This alien device detection algorithm's purpose is to determine if a device that is not registered with the CCM 62 is drawing power from the power supply bus. As discussed above, the CCM software also periodically send out "GetNewDevices" message sequences to affect the registration method set forth above as well as "StartCurrentMeasure" to instruct the measurement of input current. When the CMs 64 have all reported a current measurement, the CM software adds up all current measurements and compares sum to the current measurement made by the CCM 62 to determine if any "alien" device is drawing current from either of the two System Power Supplies. A threshold is used to establish errors in readings and normal variation from a true alien or unresponsive device. This threshold can be established either by consistent over current or a set amount. If the difference exceeds this threshold, the system responds to the alien device.

In some example low voltage distribution systems, the alien or other unresponsive devices are sent 0 W messages. If the devices are using the same control system, the message should prevent them from drawing power. In other example LVPD systems, the CCM 62 can prevent even modules ignoring these messages whether intentionally or not. The CCM software can shut down current flow to the entire bus or a section thereof where the alien device is detected. This will allow the affected users to discover their or their neighbors malfunctioning or malicious device. While this may result in legitimate users being disconnected, they may relocate their module for renewed power, while an illicit device cannot. Social pressure can be also be used to dissuade the renegade module from being connected to the LVPD system when they anger local legitimate users.

The CCM software also provides management of the device and power consumption of the system as a whole. The CCM software includes a non-sequential transmit message queue which is used to send messages in order of priority. The queue maintains a list of messages to transmit, but the CCM software sets a priority to each message. The messages are sent in order of priority to maximize bus capacity.

Figure 12:
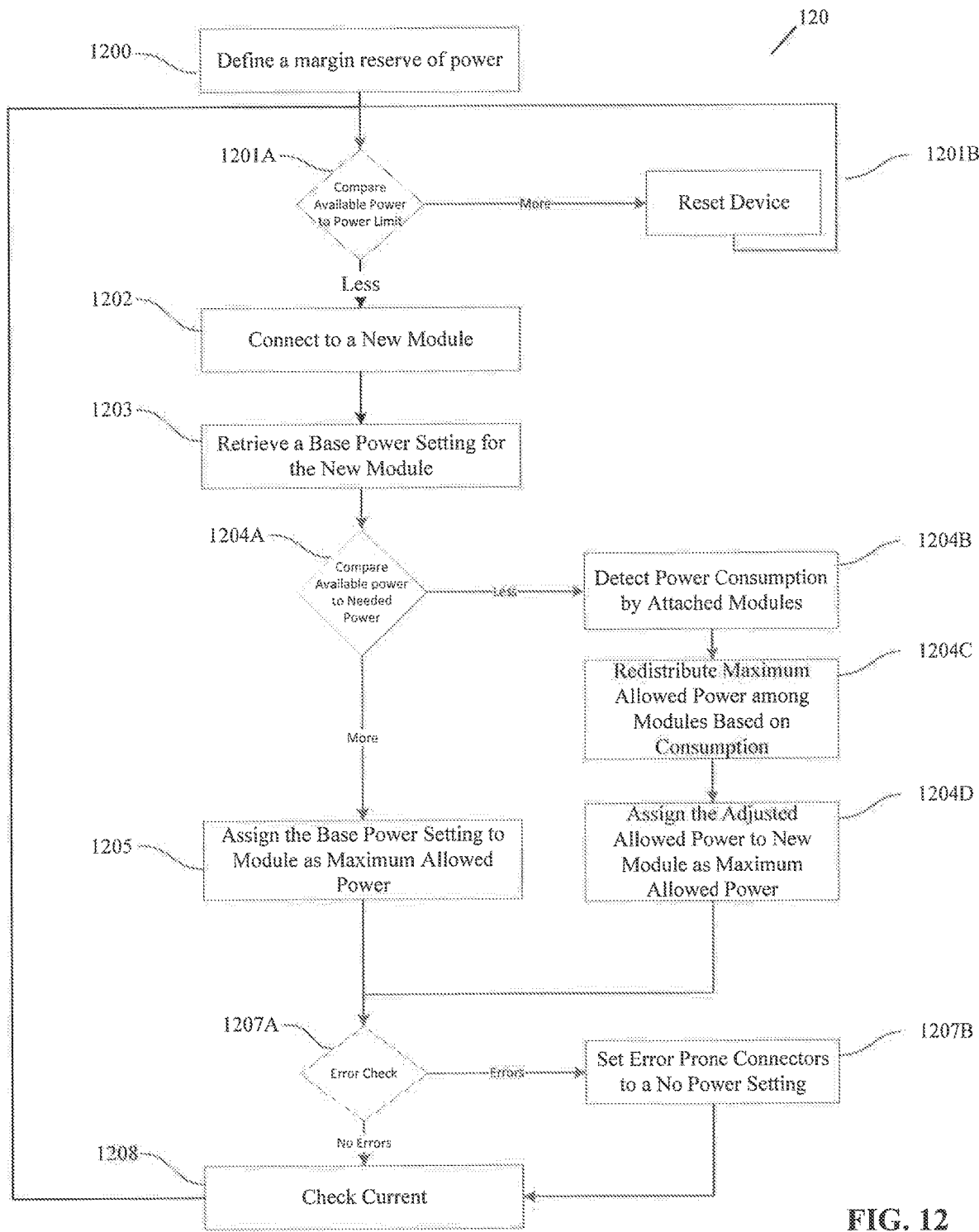
FIG. 12 illustrates a method of intelligent load distribution for an example low voltage power distribution system.

Referring to FIG. 12, an example method of an intelligent load arbitration (ILA) 120 is depicted, in the example shown, between a controller such as CCM 62 and a series of modules such as CMs 64. The intelligent load arbitration 120 manages the power provided to each device in coordination with the CMs 64. Intelligent load arbitration 120 is a software feature that is designed to: 1) prevent automatic system shutdown from occurring due to user devices exceeding the PSU's capacity on a given LVPD system and 2) enable a maximum number of user devices on a LVPD system. The LVPD system uses the ILA 120 to allocate power based on the device usage to increase the total system capacity. In the shown example, system power supply is limited to a maximum output power of about 96 Watts.

At a high level, because the CMs 64 are in communication with the CCM 62, the total current can be maintained by limiting the current at each. Each CM 64 reports its current draw and the CCM 62 uses this information to decide which CMs 64 to enable and at what power setting to make sure that the total current usage by all CMs 64 does not exceed the capacity of the system power supply. The CCM 62 will periodically poll slave devices on the bus and determine each device's requested power setting. This must be compared to a power budget that is available for the bus. The CCM 62 then may adjust the power setting of the slave device to a new power setting.

The CCM 62 must support multiple ILA algorithms for different LVDS applications. For example, the ILA 120 may vary performance based on different installation locations such as airports or hotels. The differences between the algorithms are based on how the algorithm "reserves" power for the CM. In the case of algorithms based on allocated power, the CCM 62 will reserve power based on the CM 64 power setting such as 7.5 W or 15 W. The CM 64 is "allocated" this power whether it is using the power or not. Whereas the algorithms based on actual power are based on the actual power that the CM 64 is currently using.

Referring to FIG. 12, an example of the ILA 120 with a reserve power is shown in a flowchart. At block 1201, a margin reserve of power is defined and maintained by the ILA 120. The margin reserve of power which is a difference between the total current permitted to be distributed among the CMs 64 and the maximum current load that the system can handle. The margin reserve serves to protect against a sudden increase in power demand that will cause the short circuit protection to shut-down the system if an overload occurs. The margin reserve is tuned to maximize the number of connected devices and minimize unexpected shutdowns in a specific location/use case. The power consumption limits by the CMs 64 may not respond instantaneously in some example LVPD systems. Because the LVPD system does not have immediate control of the user devices with respect to how much power they draw and when they draw it. A user device may change its power consumption at any given time and the system must be able to accommodate it without shutting down or otherwise failing.

The CCM 62 can shut down the power supply units if the current exceeds a safe level and is restarted automatically. The CCM 62 provides fast short detection and a shutdown procedure to minimize sparking as a result of a detected short. At block 1201A, the current power is measured. If the current power draw level exceeds the preset safe limits, the device is reset at block 1201B. However, this system may interrupt users' experience by disabling power flow until the device is reset.

To prevent users from losing power while using the rail of the LVPD system, the ILA 120 can also maintain a safe maximum current by distributing the power evenly amongst the devices. To do so, the ILA 120 manages an available maximum power during the addition of each new device, such as a CM 64 connected to a device. By default, a CM 64 is set to draw 0 W until it communicates with the CCM 62, but in other examples another default amount of power could be drawn such as 15 W.

At block 1202, when the new module is connected, it initiates the load management system as shown in the example implementation of the ILA 120. The system retrieves a base power setting for each new device at block 1203. As discussed above, this can be through communication with the connected devices or determined by the type of CM 64 purchased by the user. At block 1204A, the available power, which is the difference between the current power utilized by the CMs 64 and the maximum safe power level, is compared to the power requested by the new device. In other examples, the available power may be computed as the difference between the maximum safe power level and the sum of the power allowed all the connected devices. If the available power is sufficient, the new module is assigned the full amount of power requested, the base power setting, at block 1205.

If the available power is not sufficient, the system can adjust to allow the new device to draw some power by limiting the power of the other connected devices. At block 1204B, the system detects the amount of power drawn by the connected modules in total and individually. At block 1204C, the system sends commands to each of the modules to lower their total available wattage such that the available power is increased to allow the new module at least some of its requested power. At block 1204D, the new module is assigned an allowed power maximum that is at least part of its originally requested base power setting. While redistributing the maximum power settings, the ILA 120 algorithm may set CM's 64 available power a discreet amount such as 15 W, 7.5 W or 0 W, or a specific number. In some examples of the ILA 120, the power is scaled based on actual usage and in other examples the system comprises a power assignment table with power levels for different modules.

In some examples, the ILA can dynamically scale the power limitations of each module. The ILA will increment through each device in turn to adjust the power for the entire system. The ILA continuously runs to rebalance the power as loads increase or decrease on the system, also allowing power to redistribute when modules are disconnected.

If the rebalance cannot be completed or, in some other examples of the device where the system does not rebalance, the modules power draws and the additional newly added devices are prevented from drawing power. In either case, the example LVPD system can continue to provide uninterrupted power to the previously connected devices. In examples of the system with rebalancing, the ILA is then run to lower power draws first, before the power is enabled to the new device, undoing the 0 W command.

In some examples of the present system, the power levels are not decreased unless a emergency mode is enabled, e.g. when a short or overload is detected. By sending 0 W commands to the modules and preventing the modules from drawing power, the low voltage power system can prevent or mitigate disaster by making sure that the system does not exceed the safe total current.

At block 1207A, the ILA performs an error check. If a CM 64 is detected as sending errors the CCM may send a 0 W command to prevent it from drawing further power at block 1207B. This method ensures that maximum capability of the bus power supplies are not exceeded and power is shared by the various devices connected to the CMs. In some examples, the CMs can detect the type of device it is connected to and provide the right amount of current needed for maximum efficiency. In other examples, the CMs are bought specifically for certain types of devices to target the right amount of current.

At block 1208, the ILA performs a current check to determine if the power assigned is still within the set parameters before the system returns to block 1201. The ILA and CCM software provides historical performance information about the system logging this current information as well as other data. The CCM software records statistics on CM usage such as tracking the number of connected devices, the number of blocked devices (0 W setting), or other operating statistics. Statistics are saved to determine performance of the ILA algorithm as well as provide users data about their installations. This data can be removed through the data port either continuously to allow a connected PC to monitor CCM activity or downloaded onto a USB drive. Continuous monitoring also allows the user to conduct BER measurements.

Figure 13:
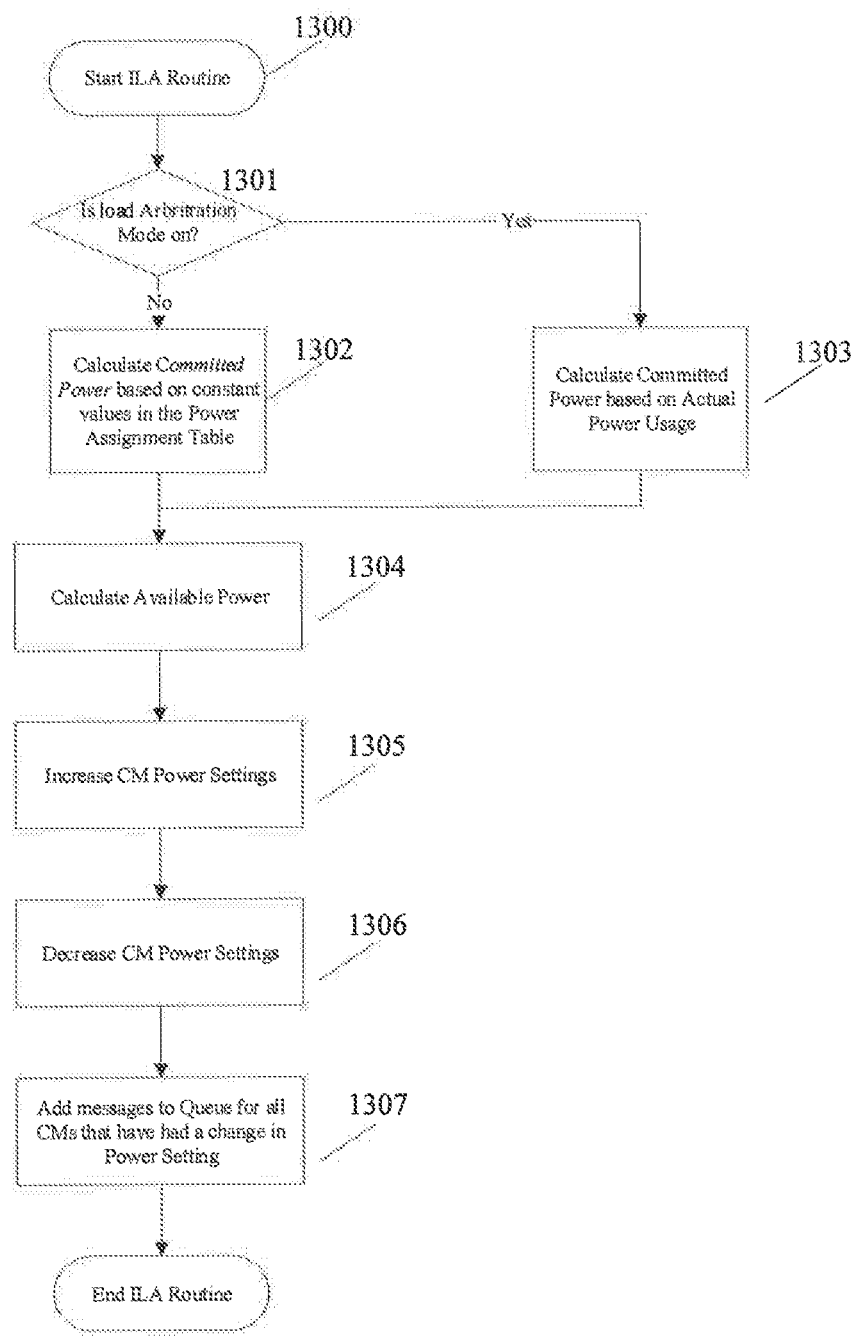
FIG. 13 shows a specific example method of intelligent load arbitration.

A specific example method of implementing the intelligent load arbitration system is shown in FIG. 13. Before the load can be intelligently distributed, the amount of power currently used must be understood. The first step is to calculate the committed power at block 1301. This can be done in two ways—Allocated Power and Actual Power. For allocated power, the power committed to existing CMs, committed power, is calculated as the sum of the New Power Settings values in the Power Assignment Table for active CMs at block 1302. In the shown example, these values are constant. In an Actual Power scenario, the committed power is calculated as the sum of the actual power usage values at block 1303. Once the value of committed power has been calculated based on either allocated or actual power, the power available to be assigned to new CMs or to be used to increase the power of existing CMs is calculated as the difference between the maximum allocated bus power and the previously committed power at block 1304.

Next, the ILA algorithm determines if any of the active CMs should have the Power Setting increased at block 1305 or decreased at block 1306 as will be discussed in turn below. The results are recorded in the Power Assignment Table by changing the value of the New Power Setting at block 1307.

Figure 14:
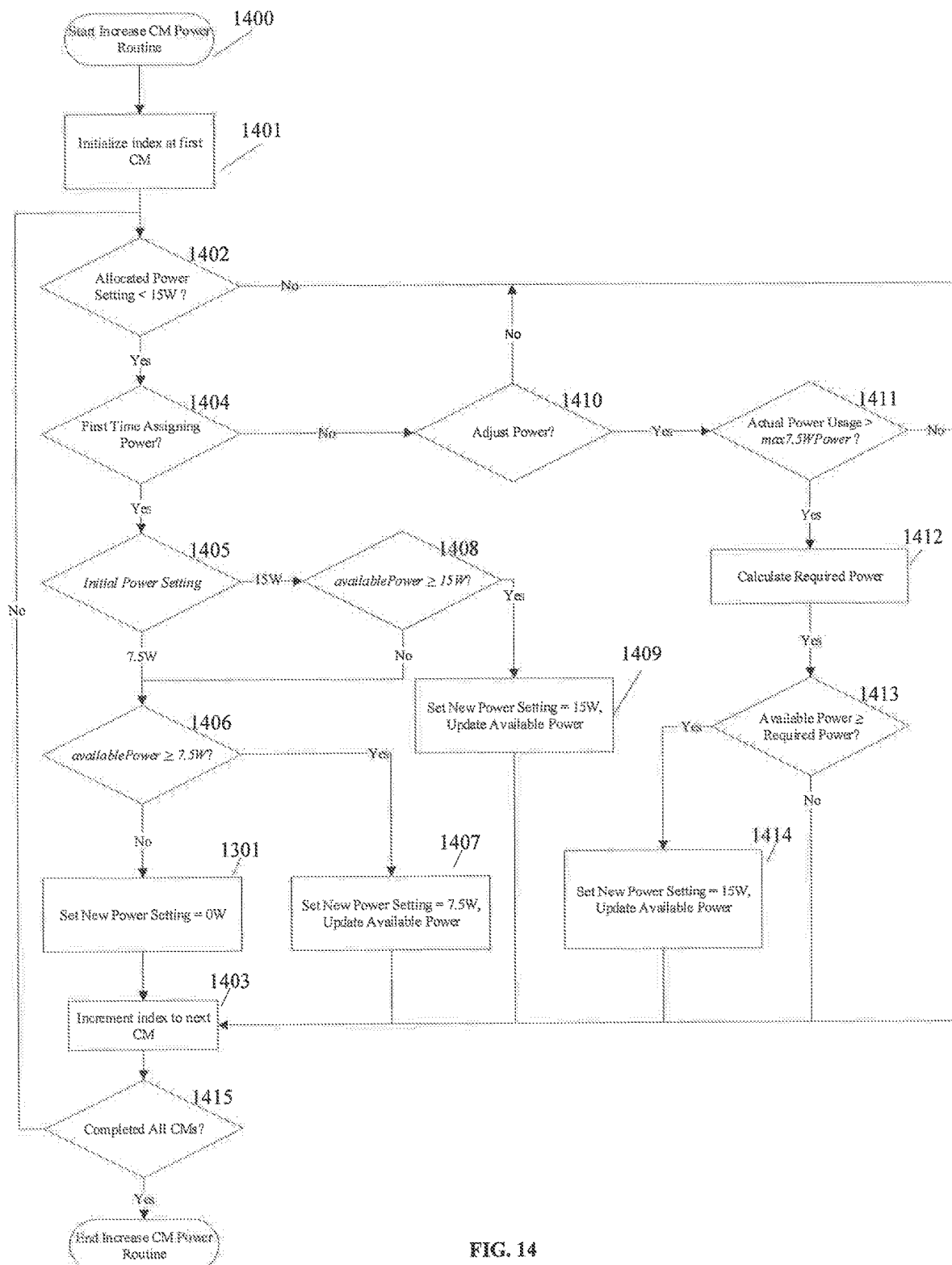
FIG. 14 shows a detailed view of the method of increasing power for a CM in the example method shown in FIG. 13.

Referring to FIG. 14, the increase algorithm 1400 goes through each CM in the order it was added to the CCMs record. If the Bus Address is not active or the Allocated Power Setting is 15 W (in which case it is already at the maximum in this example) at block 1402 then the routine increments the indexed table so that the next Bus Address is checked until all Bus Addresses are checked and every CM 64 is handled at block 1403.

Next, the CCM 62 checks to see if the CM 64 has previously been assigned power at block 1404. Then at block 1405, the system checks to determine if the initial power setting should be 7.5 W or 15 W. If it is to be 7.5 W, then available power is checked if it is at least equal to 7.5 W at block 1406. If so, the value of the New Power Setting for the CM 64 is set to 7.5 W to indicate the change in power setting and the value of the available power is decreased by 7.5 at block 1407. Note that it is assumed that the CM 64 will use the entire "extra" 7.5 W available until the Actual Power is measured even if the ILA algorithm is using Actual Power. Likewise, if the initial power setting is to be 15 W then available power is checked if it is at least equal to 15 W at block 1408. If the available power is less than 15 W, then it is checked to determine if the CM 64 can be set to 7.5 W as described above starting at block 1406. If there is 15 W available, the value of the New Power Setting for the CM 64 is set to 15 W to indicate the change in power setting and the value of the available power is decreased by 15 at block 1409. If the availablePower is less than 7.5 W then the CM 64 remains at a power setting of 0 W.

For CMs 64, that already have a power setting, the system checks if it is allowed to reassign power settings at block 1410. If it is set to readjust power, the system checks to see if the actual power usage is more than a certain threshold to determine if it needs additional room in its power setting, in one example this is 7 W for a 7.5 W setting. If so, it calculates how much power is required at block 1412. In the shown example, this is just the 7.5 W difference between the two settings. In other examples, the required power can be more or less based on a more graduated selection of power settings.

At block 1413, the available power is checked if it is high enough to allow the power increase or that the available power is at least required power. In the example shown, this is the difference between the required power and the available power. In other examples this can include a buffer in a scaling factor or margin. If it is, then the value of the new power setting for the CM is set to 15 W at 1414 to indicate the change in power setting and the value of the available power is decreased by required power. This loop continues until all CMs have been checked at block 1415.

Figure 15:
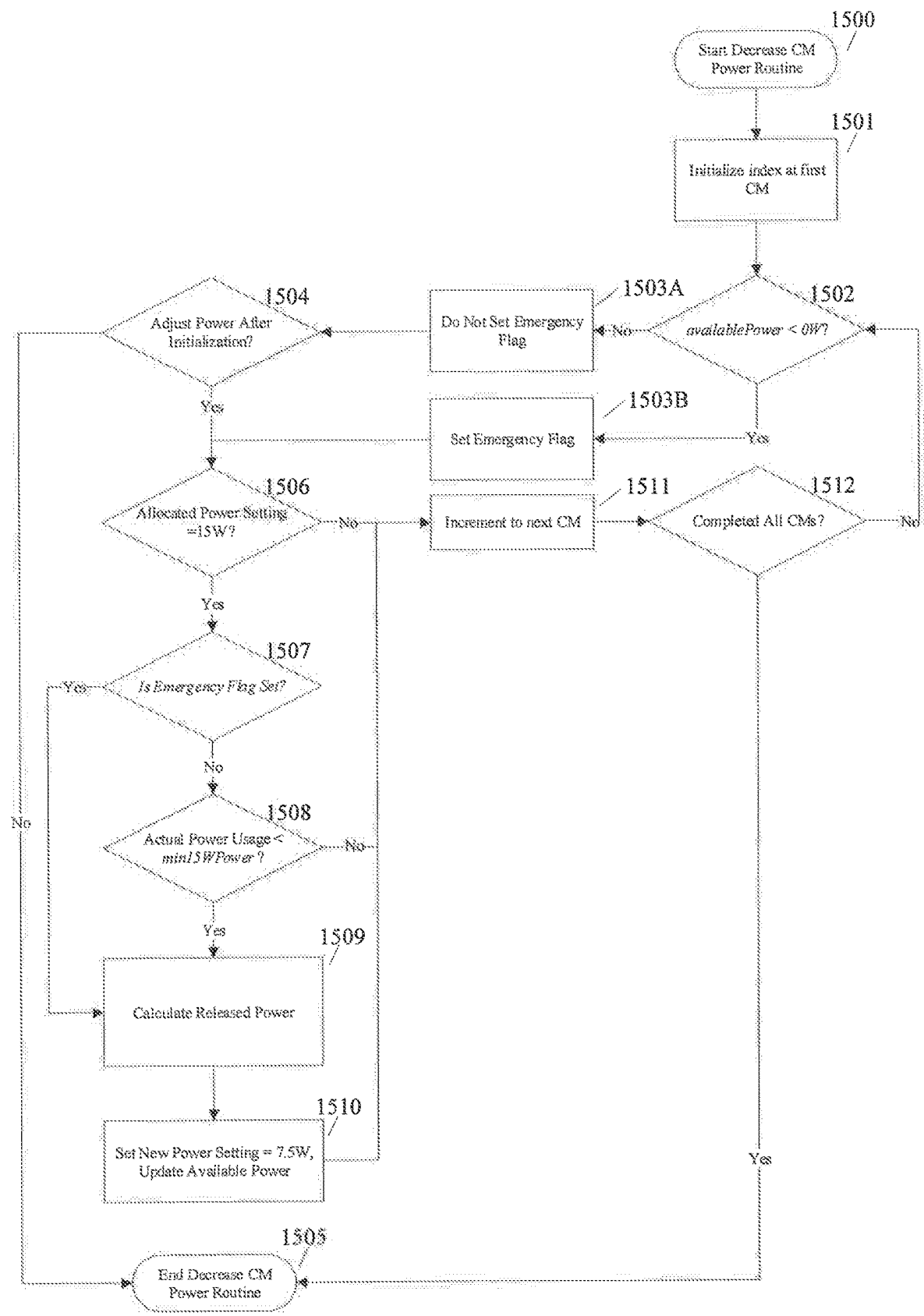
FIG. 15 shows a detailed view of the method of decreasing power for a CM in the example method shown in FIG. 13.

Referring to FIG. 15, the increase routine 1500 goes through each CM in the order it was added to the CCMs record. The decrease CM power setting routine 1500 goes through the power assignment table in reverse order of when the CMs were added to the bus to decrease the power setting of the CMs at block 1501. First, the module checks to see if there is available power at block 1502. If there is power, no emergency flag is set at block 1503A. If there is no power, the emergency flag is set at block 1503B. At block 1504, the settings are checked because, in a non-emergency case, power can only be decreased if the settings allow it. The emergency condition is when the bus is over allocated and the available power is zero or less. If there is no emergency and power is not adjusted, the routine ends at block 1505.

If the settings allow decreasing power or if the emergency flag forces the decrease, the CMs 64 set to 15 W are evaluated to be lowered at block 1506. If an emergency condition exists at block 1507 then the routine bypasses the check to determine if the Actual Power Usage is less than the minimum power allowed for a 15 W setting at block 1508. In the example shown, this minimum power is typically about 6 W, in which case the 15 W Power Setting is unnecessary for that particular CM 64. At block 1508, the released power is calculated. This is 7.5 W in the example shown where the arbitration is based on allocated power. But in examples where the actual power consumption is used, the released power is the difference between the power setting and the actual power used.

The value of the New Power Setting for the CM 64 is set to 7.5 W to indicate the change in power setting and the value of the available power is increased by the calculated value of released power at block 1510. This loop continues at block 1511 only until the available power becomes positive in the "emergency" case and then continues until all CMs have been checked if the system is allowed to generally decrease CM power at block 1512.

Turning now to specialized structures and functions of the CM 64, the module architecture is also arranged in a loop. The CM 64 can also check for a fault such as when the CM can be connected to the positive 24 VDC bus rail and the data bus line but not connected to the negative 24 VDC bus rail. In this fault example, the CM 64 can draw enough current from the data bus line to alter the signal levels on the data bus and cause corruption of bus traffic. Under these conditions, the input voltage to the CM 64 will be lower than normal, rather than the full 24 VDC. There are also other fault modes that could cause the input voltage to the CM 64 to be lower than nominal. In order to prevent improper operation with lower then nominal input voltage, the CM 64 must determine if the full 24 VDC input is present before entering normal operation. If the measured voltage value is less than prescribed DC input then the CM 64 will power down into a low power sleep mode to reduce the effect on the data bus. It shall stay in the low power mode for a set time, for example 100 ms, then wakes the system to resume code execution. The input voltage is checked again, against the prescribed DC input value and if it is still too low, sleep is initiated again. The cycle will continue until the input voltage reading is greater than or equal to the prescribed DC input value.

As mentioned above, a bootloader can be included to load new code over the one wire bus in some examples of the CM 64. If included, the bootloader runs before any other function. The bootloader shall monitor the one-wire bus port to detect a specific pattern that indicates new firmware is available. If the correct pattern is received then the bootloader will receive a new load of firmware and write it directly to the CM's flash memory. If the pattern is not recognized, then the bootloader will jump control to the main firmware and begin the initialization process. This feature can be disabled to prevent a security risk to the module such as it being reprogrammed.

After the CM system is initialized, the interrupts are enabled. The interrupts can include alarms, received transmissions, and flags for current measurement and timers. As before, when an interrupt is generated, a series of flags are utilized to indicate which routine generated the interrupt. Interrupts are handled in a prioritized order, for example messages are received at the highest priority in order to not miss data.

Figure 16:
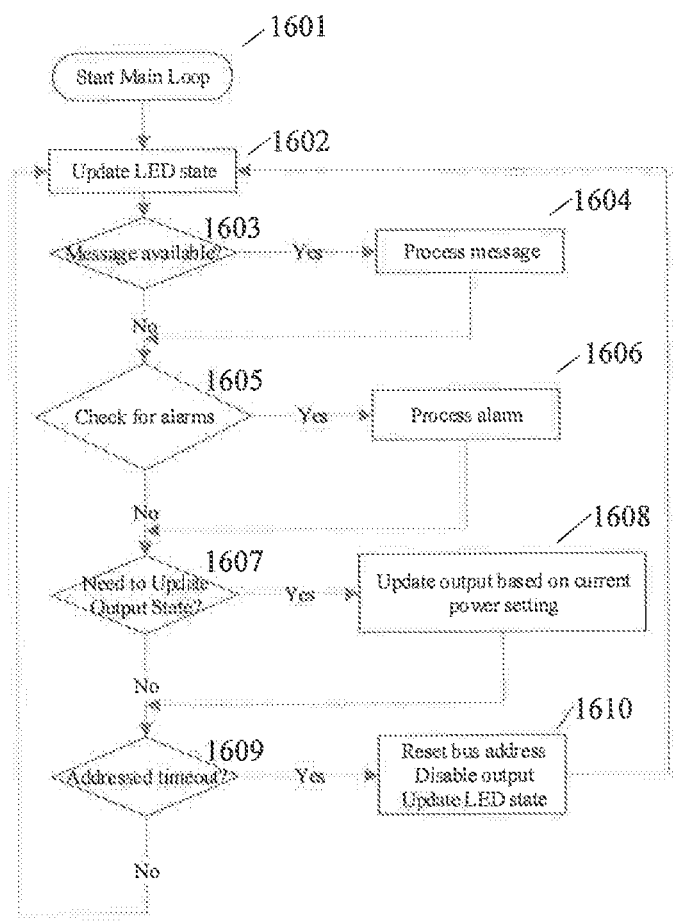
FIG. 16 is a flowchart of the central functionality of an example connector module for use with an exemplary low voltage power distribution system.

A depiction of the main loop is shown at FIG. 16 beginning at block 1601. Initially, the main state of the LED is updated to alert the user the module is online at block 1602. The system checks if a new message has been received on the one-wire bus at block 1603. If a new message is received, it then jumps to a message handling routine at block 1604. The main loop then checks for alarms at block 1605 and processes those functions at 1606. Next, if the flag to update the output state is set, the system log is set based on the current power setting at block 1609. This entry is, for example, used in an alarm check function to check for alarms that are based on whether the output is enabled or not. When the CM 64 has a bus address and is communicating on the bus with the CCM 62, this example function verifies that it is receiving addressed messages periodically. This example function is to ensure that the CCM 62 is aware of the presence of the CM 64 on the bus. If the CM 64 fails to see messages addressed to it over a set period at block 1609, it will assume that the CCM 62 is not aware of its presence on the bus and will remove itself from the bus. This is to ensure that it does not appear as an "Alien Device" to the CCM. It removes itself from the bus by resetting its bus address, disabling its output to the portable device, and updating the LED state to indicate that it is no longer active on the bus at block 1610.

As described herein, the Low Voltage Power Distribution System is designed to accept standard universal AC input power and convert it to a "touch safe"+24V DC Voltage in order to satisfy industry such as UL and NEC Class-2 requirements. The system also provides for distributing the +24V DC on an exposed rail system which allows easy access to power for a user's device charging and concurrent operation thereof. The system natively provides control and configuration functionality to enable the maximum number of users per system and allows the rail to handle fault management of the connected devices.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A low voltage power distribution system comprising:
an electrical bus comprising a carrier and an electrically conductive element linearly arranged along the carrier;
a plurality of connector modules with a base power setting and a maximum allowed power, the connector module adapted to be releasably couplable to the carrier being in electrical communication with the electrical bus;
a power supply unit with an amount used of the total power; and
a control module configured to monitor the available power and amount used of the total power of the low voltage bus system, the control module in communication with each of the connector modules and capable of retrieving the base power setting;
wherein when a new connector module is connected to the electrical bus, the control module:
redistributes the maximum allowed power of each of the connected modules if the base power setting of the new module exceeds the available power, and
assigns a new module allowed maximum power to the new module wherein the allowed maximum power is:
the base power setting if the available power exceeds the base power setting of the new module, and
a fraction of the base power setting if the base power setting of the new module exceeds the available power.

2. The low voltage power distribution system of claim 1 further comprising a fault detection system.

3. The low voltage power distribution system of claim 2 wherein the fault detection system is configured to compare the amount used of the total power to a safe power load limit and shut down the system if the safe power load limit is exceeded.

4. The low voltage power distribution system of claim 3 wherein the fault detection system is further configured to automatically reset the system.

5. The low voltage power distribution system of claim 1 wherein the connector module is configured to detect and communicate the base power setting based on a type of a connected device.

6. The low voltage power distribution system of claim 1 wherein the control module is further configured to detect the power consumption of each of the connected modules.

7. The low voltage power distribution system of claim 6 wherein the control module is further configured to redistribute the maximum allowed power by a scalable factor dependent on power consumption detected for each of the connected modules.

8. A low voltage power distribution system comprising:
an electrical bus comprising a carrier with at least a pair of electrically conductive elements linearly arranged along the carrier, and a linearly arranged ferromagnetic element carried by the carrier intermediate at the at least a pair of electrically conductive elements;
a plurality of connector modules with a base power setting and a maximum allowed power, the connector module adapted to be releasably couplable in a plurality of orientations relative to the carrier, the carrier being in electrical communication with the electrical bus;
a power supply unit with a total power;
a plurality of electrically conductive contacts carried by the housing wherein the plurality of electrically conductive contacts are arranged such that at least a first one of the plurality of electrically conductive contacts will engage one of the at least a pair of electrically conductive elements and at least a second one of the plurality of electrically conductive contacts will engage a different one of the at least a pair of electrically conductive elements when the housing is releasably coupled to the carrier in each of the plurality of orientations relative to the carrier;
at least one magnet carried by the housing and disposed intermediately the plurality of electrically conductive contacts wherein the at least one magnet is arranged to generate a magnetic field to magnetically cooperate with the ferromagnetic element of the carrier to releasably couple the housing upon the carrier in at least each of the plurality of orientations relative to the carrier; and
a control module configured to monitor the available power and amount used of the total power of the low voltage bus system, the control module in communication with each of the connector modules and capable of retrieving the base power setting;
wherein when a new connector module is connected to the electrical bus, the control module:
redistributes the maximum allowed power of each of the connected modules if the base power setting of the new module exceeds the available power and
assigns a new module allowed maximum power to the new module wherein the allowed maximum power is
the base power setting if the available power exceeds the base power setting of the new module and
a fraction of the base power setting if the base power setting of the new module exceeds the available power.

9. A method of intelligently managing power load of a low voltage bus system including a plurality of connected modules comprising:
defining a marginal reserve of power as a portion of a total power of the low voltage bus system;
monitoring the amount used of the total power of the low voltage bus system;
connecting a new module to the low voltage bus system;
retrieving a base power setting for the new module;
calculating remaining available power as the difference between total power and a marginal reserve of power;

comparing the base power setting of the new module to the available power;

redistributing a maximum allowed power of the connected modules if the base power setting of the new module exceeds the remaining available power; and assigning a new module allowed maximum power to the new module wherein the allowed maximum power is the base power setting if the available power exceeds the base power setting of the new module, and a fraction of the base power setting if the base power setting of the new module exceeds the available power.

10. The method of intelligently managing power load of a low voltage bus system of claim 9 further comprising:

comparing the amount used of the total power to a safe power load limit;

ceasing a power flow to a rail to which the connected modules are connected if the safe power load limit is exceeded; and resuming the power flow the system after a period of waiting.

11. The method of intelligently managing power load of a low voltage bus system of claim 9 wherein the base power setting for the module is detected by the module based on a product type.

12. The method of intelligently managing power load of a low voltage bus system of claim 9 wherein the base power setting for the module is preset into the module.

13. The method of intelligently managing power load of a low voltage bus system of claim 9 further comprising:

checking for error messages and responsiveness from the connected modules;

ceasing a power flow to the connected module if the module is in; and resetting the system.

14. The method of intelligently managing power load of a low voltage bus system of claim 9 wherein the maximum allowed power is assigned to each connected module as a discreet setting.

15. The method of intelligently managing power load of a low voltage bus system of claim 9 further comprising detecting the power consumption of each of the connected modules.

16. The method of intelligently managing power load of a low voltage bus system of claim 15 wherein the maximum allowed power is assigned to each connected module as a scalable setting dependent on power consumption.

17. The method of intelligently managing power load of a low voltage bus system of claim 9 further comprising retaining historical data relating to at least one of total current, current of each of the connected modules, a count number of the connected modules, a length of time each module is connected, peak current of each connected module.

18. The method of intelligently managing power load of a low voltage bus system of claim 9 further comprising an alien detection procedure.

19. The method of intelligently managing power load of a low voltage bus system of claim 18 wherein the alien detection procedure can shut down current flow to an entire bus or a section thereof where an alien device is detected.

20. The method of intelligently managing power load of a low voltage bus system of claim 19 further comprising detecting the alien device by comparing a sum of module provided currents on the entire bus or a section thereof to the amount of current being provided to the entire bus or a section thereof.

* * * * *